United States Patent
Maurer et al.

(10) Patent No.: US 9,791,034 B1
(45) Date of Patent: Oct. 17, 2017

(54) TORQUE SENSOR PACKAGING FOR AUTOMATIC TRANSMISSIONS

(71) Applicant: Ford Global Technologies, LLC, Dearborn, MI (US)

(72) Inventors: Jeffrey Edward Maurer, Commerce, MI (US); Bruce Granstrom, Dearborn, MI (US); Gregory Daniel Goleski, Rochester Hills, MI (US); John Edward Brevick, Livonia, MI (US); Gregory Michael Pietron, Canton, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/098,796

(22) Filed: Apr. 14, 2016

(51) Int. Cl.
| | |
|---|---|
| *G01L 3/10* | (2006.01) |
| *F16H 57/021* | (2012.01) |
| *F16H 57/023* | (2012.01) |
| *F16H 1/28* | (2006.01) |
| *F16H 59/14* | (2006.01) |
| *F16H 57/02* | (2012.01) |

(52) U.S. Cl.
CPC ............ *F16H 57/021* (2013.01); *F16H 1/28* (2013.01); *F16H 57/023* (2013.01); *F16H 59/14* (2013.01); *G01L 3/101* (2013.01); *F16H 2057/02026* (2013.01); *F16H 2059/148* (2013.01)

(58) Field of Classification Search
None
See application file for complete search history.

(56) References Cited

U.S. PATENT DOCUMENTS

| | | | | |
|---|---|---|---|---|
| 4,885,944 A | * | 12/1989 | Yagi | G01L 3/102 73/862.335 |
| 4,887,461 A | * | 12/1989 | Sugimoto | G01L 3/102 73/114.15 |
| 5,137,128 A | * | 8/1992 | Takei | F16D 37/02 192/21.5 |
| 5,398,555 A | * | 3/1995 | Ueno | G01L 3/109 73/862.321 |
| 6,260,421 B1 | * | 7/2001 | Torbjornsson | G01L 3/102 73/862.331 |
| 6,846,260 B2 | * | 1/2005 | Horiuchi | F16H 59/16 475/125 |
| 7,491,145 B2 | * | 2/2009 | Mizon | B60K 23/0808 475/198 |
| 7,963,179 B2 | | 6/2011 | Schmitz | |

(Continued)

*Primary Examiner* — Dirk Wright
(74) *Attorney, Agent, or Firm* — James Dottavio; Brooks Kushman, P.C.

(57) ABSTRACT

A transmission includes a main housing having a rear wall and at least one sidewall extending from the rear wall. The rear wall has an outer side and has an inner side that cooperates with the at least one sidewall to define an interior. A planetary gearset is disposed within the interior. An output shaft is coupled to the gearset and extends through a hole defined in the rear wall. An extension housing is connected to a rear portion of the main housing such that the outer side and the extension housing cooperate to define a torque-sensor cavity. The output shaft extends through the cavity. A torque sensor is disposed within the cavity adjacent to the output shaft and has an electrical connector disposed in a wall of the extension housing.

16 Claims, 3 Drawing Sheets

(56) References Cited

U.S. PATENT DOCUMENTS

| | | | |
|---|---|---|---|
| 8,433,485 B2 * | 4/2013 | Marin | G01L 3/102 |
| | | | 701/51 |
| 8,844,379 B2 * | 9/2014 | Pietron | G01L 3/101 |
| | | | 73/115.02 |
| 9,074,953 B2 * | 7/2015 | Pietron | G01L 3/103 |
| 9,285,282 B2 * | 3/2016 | Kapas | G01L 3/101 |
| 9,383,273 B2 * | 7/2016 | Kapas | G01L 3/102 |
| 9,618,407 B2 * | 4/2017 | Pietron | G01L 3/101 |
| 2005/0204830 A1 | 9/2005 | Kuroda et al. | |

* cited by examiner

TORQUE SENSOR PACKAGING FOR AUTOMATIC TRANSMISSIONS

TECHNICAL FIELD

The present disclosure relates to automatic transmissions having torque sensors.

BACKGROUND

An automatic transmission of a vehicle includes an input shaft and an output shaft. The input shaft receives an input torque at an input speed from power derived from a power source, such as an engine. The transmission converts the input torque at the input speed to an output torque at an output speed. The output shaft transmits the output torque at the output speed to traction wheels of the vehicle in order to propel the vehicle.

The transmission converts the input torque at the input speed to the output torque at the output speed by adjusting a gear ratio (for example, during an up-shift or down-shift) between the input and output shafts. Transmission shifting is accomplished by applying and/or releasing friction elements (such as clutches, band-brakes, etc.) to change speed and torque relationships by altering planetary gear configurations of the transmission. As a result, power flow paths are established and disestablished from the engine to the wheels.

The friction elements must be properly controlled in order to satisfactorily shift the transmission. To this end, information regarding the operation of the transmission is used to control the friction elements. For instance, information indicative of the input torque received by the input shaft and the speed of the input shaft and information such as vehicle speed and throttle opening may be used. Similarly, information indicative of the output torque transmitted by the output shaft and the speed of the output shaft may be used.

SUMMARY

According to one embodiment, a transmission includes a main housing having a rear wall and at least one sidewall extending from the rear wall. The rear wall has an outer side and has an inner side that cooperates with the at least one sidewall to define an interior. One or more planetary gearsets are disposed within the interior. An output shaft is coupled to a rear-most gearset and extends through a hole defined in the rear wall. An extension housing is connected to a rear portion of the main housing such that the outer side and the extension housing cooperate to define a torque-sensor cavity. The output shaft extends through the cavity. A torque sensor is disposed within the cavity adjacent to the output shaft and has an electrical connector disposed in a wall of the extension housing.

According to another embodiment, a transmission includes a main housing having a rear wall defining a hole. An output shaft extends through the hole. An extension housing cooperates with the rear wall to define a cavity. The output shaft extends through the cavity. A torque sensor is disposed within the cavity adjacent to the output shaft and has an electrical connector disposed in a wall of the extension housing.

According to yet another embodiment, a method of assembling a transmission that has a main housing includes assembling a torque-sensor housing to a rear portion of the main housing such that a torque-sensor cavity is defined by the cooperation of the rear portion and the torque-sensor housing. The method further includes installing an output shaft through a hole defined in the torque-sensor housing and into the cavity. The method also includes installing a torque sensor in the cavity such that the sensor is adjacent to the output shaft, and installing a torque-sensor connector in a hole defined in the torque-sensor housing. The connector is electrically connected to the sensor by wiring.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
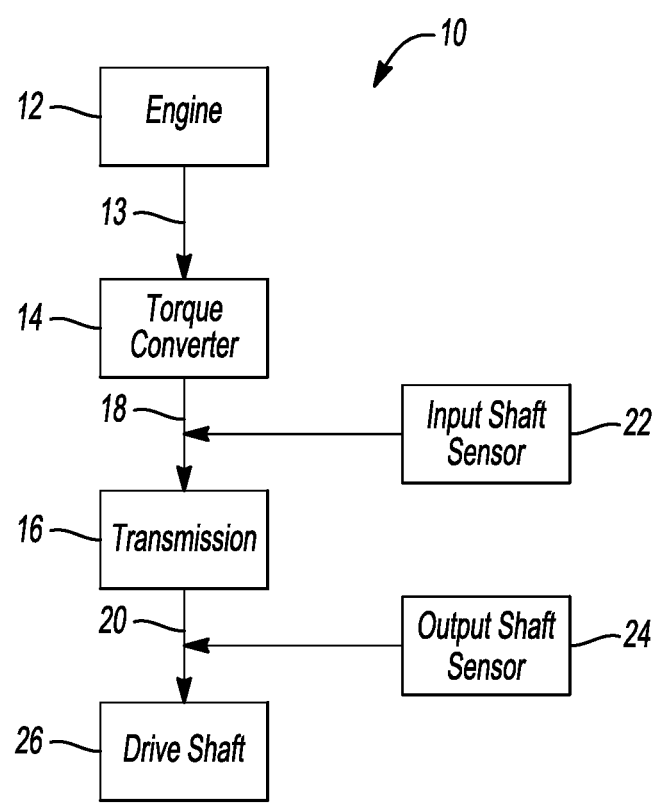
FIG. 1 illustrates a block diagram of an example vehicle powertrain.

Referring to FIG. 1, a powertrain 10 may include an engine 12, a torque converter 14, and an automatic transmission 16. The transmission 16 has an input shaft 18 and an output shaft 20. The engine 12 delivers torque to a torque converter 14 via a crankshaft 13 that is connected to the torque converter 14. The torque converter 14 converts the engine torque into an input torque at an input speed and transmits the input torque at the input speed to an input shaft 18 of the transmission 16. The transmission 16 serves to change a gear ratio and thus changes the input torque at the input speed into an output torque (for example, increased torque) at an output speed (for example, reduced speed). The transmission 16 transmits the output torque at the output speed to an output shaft 20. The output shaft 20 is connected to a driveshaft 26 via a U-joint or similar means. The driveshaft 26 extends between the output shaft 20 and a rear differential (not shown). The differential provides torque to the rear wheels via a pair of rear axles.

While not shown herein, the present invention can be used in a hybrid powertrain that includes, for example, an engine and an electric motor with or without a torque converter.

Torque and speed of the input shaft and the output shaft are typically estimated based on various available information. One way to avoid estimation is to use a sensor mounted within the transmission to directly detect the torque and/or speed parameters. For example, the powertrain 10 further includes at least one of an input shaft sensor 22 and an output shaft sensor 24. The input shaft sensor 22 is associated with input shaft 18 and is configured to monitor at least one of (input) torque and (input) speed of input shaft 18. Similarly, the output shaft sensor 24 is associated with the output shaft 20 and is configured to monitor at least one of (output) torque and (output) speed of the output shaft 20. The input and output shaft sensors 22 and 24 provide sensor signals indicative of the monitored information to a controller (not shown) that controls operation of the transmission 16 accordingly.

Automotive design constraints are pushing engineers to design lighter and more compact transmissions. As such, the space within an interior of a transmission housing is becoming more and more limited. Packaging a torque sensor within this limited interior space is challenging.

Figure 2:
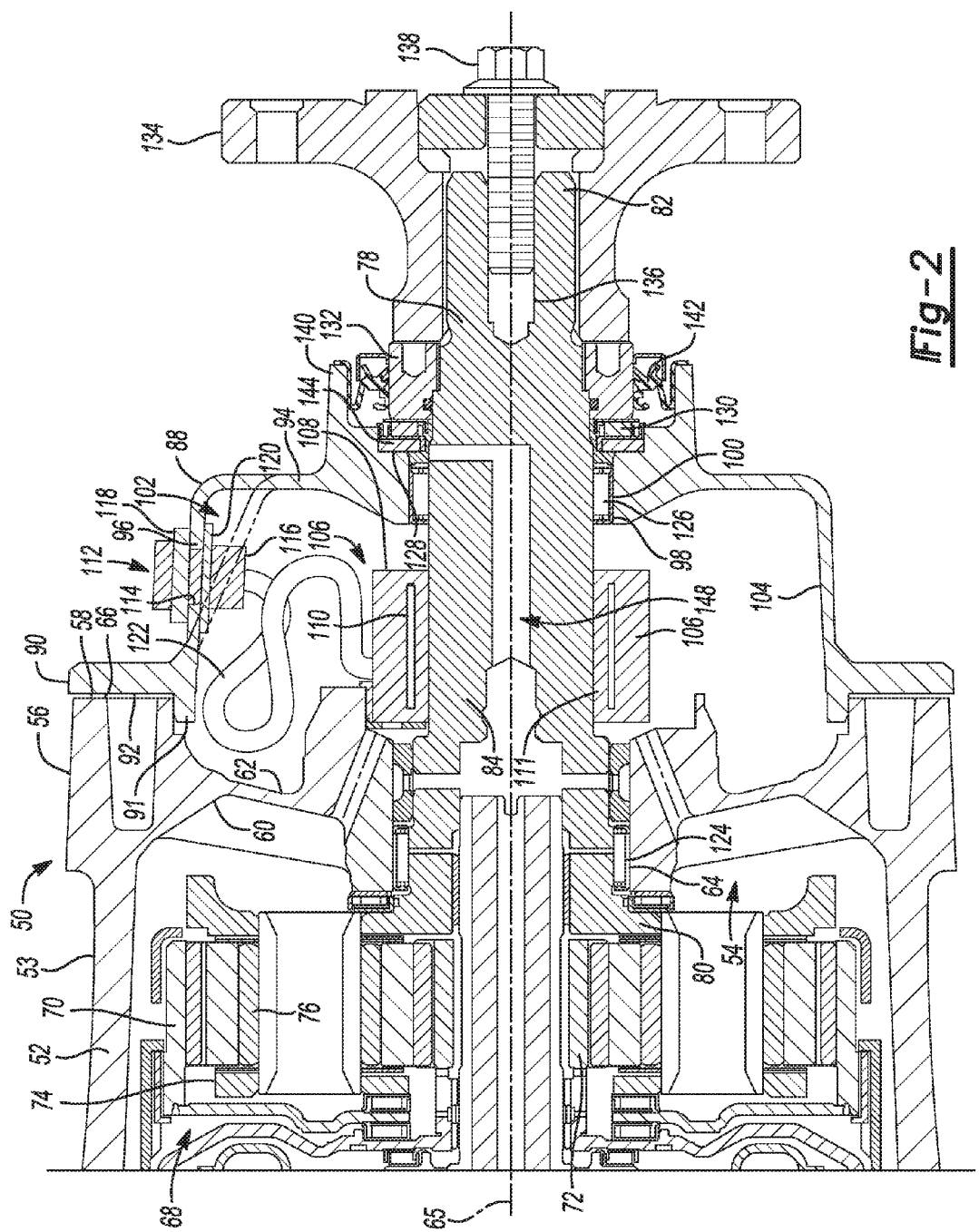
FIG. 2 is a cross sectional view of a rear portion of a transmission according to one embodiment.

Referring to FIG. 2, an example transmission 50 includes a main housing 52 that bolts to a rear portion of the engine. The transmission 50 may be an automatic transmission for a rear-wheel drive vehicle, such as a 4×2 pickup truck. The main housing 52 defines an interior 54 that houses a majority of the main transmission components (such as the gearing, clutches, pump, valve body, etc.). The main housing 52 includes a rear portion 56 having a rear wall 58 and at least one sidewall 53 extending forward from the rear wall. The rear wall 58 includes an inner side 60 that is within the interior 54, and an outer side 62 that forms a portion of the outer surface of the main housing 52. A hole 64 extends through the rear wall 58 between the inner side 60 and the outer side 62. The hole 64 may be centered about a centerline 65 of the transmission 50.

One or more planetary gear sets are disposed within the interior 54 and are operably coupled between an input shaft and an output shaft 78 to effectuate a gear ratio between the input and output shafts. For example, the transmission 50 may include four planetary gearsets arranged in series. The rear-most planetary gearset, gearset 68, is disposed in the rear portion 56 of the housing 52. The gearset 68 may include a ring gear 70, a sun gear 72, a planet carrier 74, and a plurality of planet gears 76. The shaft of each of the planet gears 76 may be operably coupled with the carrier 74. The carrier 74 may include holes that receive the shaft of the planet gears. The carrier may include a park gear having teeth circumferentially arranged on an outside diameter of the gear. The teeth on the carrier may engage with the park pawl (not shown) in order to lock the transmission 50 preventing the vehicle from moving when parked. A proximal end 80 of the output shaft 78 is coupled to the carrier 74. In the illustrated embodiment, the carrier 74 is integrally formed with the shaft 78. In other embodiments, the proximal end of the output shaft is splined to the carrier.

The output shaft 78 extends through the hole 64 and includes a distal end 82 that is splined, or otherwise connected, to a driveshaft flange 134. A universal joint (not shown) of the driveshaft mounts to the flange 134. The flange 134 may be connected to the output shaft 78 via a bolt 138 that is received within an inner bore 136 of the shaft. A bearing 124 may be disposed between the hole 64 and the output shaft 78 to support the shaft within the housing 52. The bearing 124 may include an outer race disposed against the perimeter of the hole 64, an inner race disposed against the shaft 78, and a plurality of roller bearings disposed between the races.

The transmission 50 also includes a torque sensor 106 for measuring a torque and/or speed of the output shaft 78. Rather than attempting to package the torque sensor in the interior 54, which has very limited space, the torque sensor 106 is external to the main housing 52; it is not disposed within the interior 54. To accomplish this type of packaging, the output shaft 78 is extended in length (e.g., by 58 mm) and a secondary housing, such as extension housing 88 (or torque-sensor housing), is connected to the rear portion 56 of the main housing 52 such that a torque-sensor cavity 102 is formed on the rear side of the transmission 50. The torque sensor 106 is disposed in the cavity 102 adjacent to the output shaft 78.

The extension housing 88 may include a front portion 90 having a mounting surface 92 that is disposed against the mounting surface 66 of the rear wall 58. Bolts or other attachment means may be used to connect the extension housing 88 to the main housing 52. The extension housing 88 may include a pilot 91 for aligning the extension housing to the main housing. The pilot 91 extends forwardly past the mounting surface 92. The extension housing 88 and the rear wall 58 cooperate to define the cavity 102. The extension housing 88 also includes a rear vertical wall 94 and at least one horizontal wall 96 that extends between the mounting surface 92 and the rear wall 94. (It is to be understood that the rear wall 94 may not be exactly vertical and the horizontal wall may not be exactly horizontal in some embodiments.) The rear wall 94 defines a second hole 98 having a perimeter 100. The output shaft 78 is sized to extend through the cavity 102 and extend through the hole 98. A bearing 126 is disposed within the second hole 98 between the output shaft 78 and the perimeter 100. The bearing 126 may include an outer race disposed against the perimeter 100, an inner race disposed against the output shaft 78, and a plurality of roller bearings disposed between the inner and outer races. Bearing 124 and bearing 126 may be axially aligned such that a center point of each bearing is located on the centerline 65 of the transmission. The diameter of the bearings may be the same or may be different. The rear wall 94 may include a structural surface 128 that circumscribes the output shaft 78. The structural surface 128 is configured to receive a washer 144 that provides a trust surface for the output shaft 78.

A bearing 130 seats on the washer 144 and is disposed between the structural surface 128 and the jam nut 132. The bearing 130 may be roller bearing similar to bearings 124, 126. The rear wall 94 also includes an extended portion 140 that projects rearwardly from the rear wall 94 near the outer edge of the vertical structural surface 128. The extended portion overlaps with the jam nut 132 such that a seal 142 may be installed between the extended portion 140 and the jam nut 132 to prevent oil from leaking from the housing.

In some embodiments, the sensor 106 is a magnetic torque sensor for monitoring torque of the shaft 78. In other embodiments, the sensor 106 is a speed sensor for monitoring the speed of the shaft 78. Further, the torque sensor 106 may be a magnetic torque and speed sensor for monitoring both the speed and the torque of the output shaft 78.

The torque sensor 106 may include a housing 108 that defines a inner diameter (hole) 111. The torque sensor 106 may be disposed in the cavity 102 such that the shaft 78 extends through the hole 111. In other embodiments the torque sensor is not an annulus. Instead, the torque sensor is only disposed around a portion of the output shaft. The torque sensor 106 may be mounted to the outer side 62 of the rear wall 58. The torque sensor 106 includes one or more sensing elements 110 that are stationary relative to the rotating shaft 78. The sensing elements 110 may be magnetic-flux-sensing elements such as fluxgate sensors (these are also known as magneto-elastic elements). The sensor may also be surface-acoustic wave sensor, or a strain gage. The shaft 78 includes a sensor zone 84 that is disposed within the inner diameter 111 of the sensor 106. The sensor zone 84 is a smooth surface on the shaft with a constant diameter and controlled hardness. The sensor zone 84 may be a magnetized region that extends circumferentially around the shaft 78. The shaft 78 may be made of steel having a high nickel content (such as 4340 steel alloy) preferably with a martensite structure in order to magnetize the shaft. The shaft 78 is hardened to enable permanent magnetization. Applied torque to the shaft 78 creates a magnetic flux that is sensed by the sensor 106 in order to determine the speed and/or the torque of the shaft 78.

The torque sensor 106 also includes an electrical connector 112 disposed within a hole 114 defined by the horizontal wall 96 of the extension housing 88. The electrical connector 112 may be a receptacle configured to receive a plug of a wiring harness (not shown) to electrically connect the torque sensor to the transmission controller. The electrical connector 112 may include a body 116 that is partially disposed within the cavity 102 and that is partially outside of the housing 88. The body 116 may be mounted to the wall 96 by a retaining means 118 (such as a nut, clip, grommet, or snap ring). A seal 120 may be disposed against the inner surface 104 of the cavity 102 around the hole 114 to prevent oil from leaking around the electrical connector 112. Wiring 122 extends between the body 116 and the housing 108 of the torque sensor 106. The wiring 122 is disposed within the cavity 102.

In order to lubricate the rear bearings 126, 130 and the distal end of the output shaft 78, the output shaft 78 may define at least one passageway 148, The passageway 148 is in fluid communication with the valve body and is configured to convey oil to lubricate the output shaft bearings 126, 130.

Figure 3:
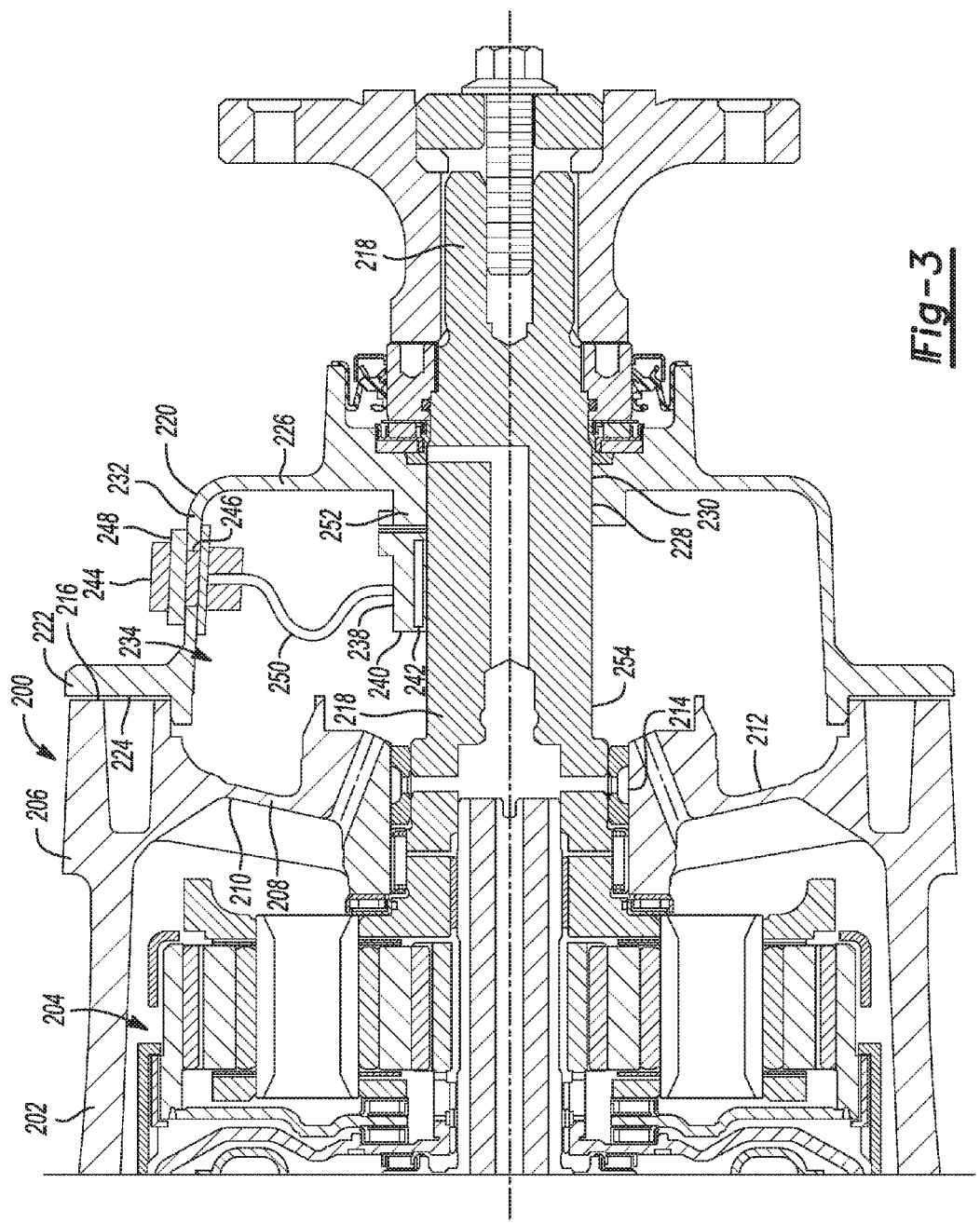
FIG. 3 is a cross sectional view of a rear portion of a transmission according to another embodiment.

Referring to FIG. 3, an example transmission 200 includes a main housing 202 that mounts to a rear portion of the engine. The main housing 202 defines an interior 204 that houses a majority of the main transmission components. The main housing 202 includes a rear portion 206 having a rear wall 208. The rear wall 208 includes an inner side 210 that is within the interior 204, and an outer side 212 that forms a portion of the outer surface of the main housing 202. A hole 214 is defined in the rear wall 208 and extends between the inner side 210 and the outer side 212. The hole 214 may be centered about a centerline of the transmission 200.

One or more planetary gear sets are disposed within the interior 204 and are operably coupled between an input shaft and an output shaft 218 to effectuate a gear ratio between the input and output shafts. A proximal end of the output shaft 218 is coupled the last planetary gear set and a distal end is connected to a driveshaft flange.

An extension housing 220 is mounted to the rear wall 208 by fasteners or other means known in the art. The extension housing 220 may include a front portion 222 having a mounting surface 224 that is disposed against the mounting surface 216 of the rear wall 208. The extension housing 220 and the rear wall 208 cooperate to define a torque-sensor cavity 234. The extension housing 220 also includes at least one rear vertical wall 226 and at least one horizontal wall 232 that may extend between the mounting surface 224 and the rear wall 226. (It is to be understood that the rear wall 226 may not be exactly vertical and the horizontal wall 232 may not be exactly horizontal in some embodiments.) The rear wall 226 defines a second hole 228 having a perimeter 230.

The output shaft 218 is sized to extend into the cavity 234 through hole 214 and to extend out of the cavity 234 through hole 228. Bearings are disposed around the output shaft 218 at the holes to support the shaft as described above.

The transmission 200 also includes a torque sensor 238 for measuring a torque and/or speed of the output shaft 218. Rather than attempting to package the torque sensor in the interior 204, which has very limited space, the torque sensor 238 is packaged inside the torque-sensor cavity 234. In this embodiment, the torque sensor is mounted to the extension housing 220 at a location adjacent to the output shaft 218. For example, the extension housing 220 includes a flange 252 that extends forward from the rear vertical wall 226. The flange 252 has a mounting surface that engages with a mounting surface of the sensor housing 240. The flange 252 is sized and located to support the torque sensor 238 adjacent to a sensing zone of the output shaft 218.

The torque sensor 238 also includes sensing elements 242 disposed adjacent to the sensing region 254 of the shaft to measure a torque and/or speed of the output shaft as described above. The sensor 238 includes a connector 244 that is disposed in a hole 246 defined in the horizontal wall 232 of the extension housing. The connector 244 may include threads that cooperate with a nut 248 to secure the connector 244 to the housing 220. Wiring 250 is disposed within the torque-sensor cavity 234 and electrically connects between the connector 244 and the sensor housing 240. In the illustrated embodiment, the torque sensor 238 does not fully circumscribe the output shaft 218 as was shown in FIG. 2. Instead, the housing 240 extends around an arcuate portion of the shaft. Of course, in other embodiments, the sensor housing 240 may be an annulus that receives the output shaft 218 therethrough.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
    a main housing including a rear wall and at least one sidewall extending from the rear wall, wherein the rear wall has an outer side and has an inner side that cooperates with the at least one sidewall to define an interior, and the rear wall defines a hole;
    a planetary gearset disposed within the interior;
    an output shaft coupled to the gearset and extending through the hole;
    an extension housing connected to a rear portion of the main housing such that the outer side and the extension housing cooperate to define a torque-sensor cavity, wherein the output shaft extends through the cavity; and a magneto-elastic torque sensor disposed within the cavity and including a sensor housing defining a bore that receives the output shaft therethrough such that the sensor housing encircles the output shaft, the torque sensor further including magnetic-flux sensing elements disposed within the housing and an electrical connector disposed in a wall of the extension housing, wherein the sensor housing is directly attached to an interior surface of the extension housing.

2. The transmission of claim 1 wherein the sensor housing is completely disposed within the cavity.

3. The transmission of claim 1 wherein the extension housing includes an axially extending wall adjacent to the output shaft and a radially extending wall that intersects with the axially extending wall, wherein the sensor case is mounted to the radially extending wall.

4. The transmission of claim 1 wherein the extension housing defines a second hole and wherein the output shaft extends through the second hole.

5. The transmission of claim 4 further comprising a bearing disposed between a perimeter of the second hole and the output shaft.

6. The transmission of claim 1 wherein the torque sensor further comprises wiring connected between the torque sensor and the connector.

7. The transmission of claim 1 wherein the output shaft further includes a proximal end connected to the planetary gearset and a distal end connected to a driveshaft yolk.

8. The transmission of claim 1 wherein the extension housing defines a structural surface, and further comprising a bearing disposed against the structural surface.

9. The transmission of claim 1 wherein the extension housing is fastened to the housing.

10. A transmission comprising:
a main housing including a rear wall defining a hole;
an output shaft extending through the hole;
an extension housing cooperating with the rear wall to define a cavity, wherein the output shaft extends through the cavity; and a torque sensor including:
a housing fully encircling the output shaft and having an outer surface directly connected to the extension housing, and
magnetic-flux sensing elements disposed within the housing.

11. The transmission of claim 10 wherein the torque sensor is completely disposed in the extension housing.

12. The transmission of claim 10 wherein the extension housing defines a second hole, and the output shaft extends through the second hole.

13. The transmission of claim 12 further comprising a bearing disposed between a perimeter of the second hole and the output shaft.

14. A method of assembling a transmission including a main housing, the method comprising:
assembling a torque-sensor housing to a rear portion of the main housing such that a torque-sensor cavity is defined by the cooperation of the rear portion and the torque-sensor housing;
installing a magneto-elastic torque sensor in the cavity by directly connecting a sensor case of the torque sensor to an interior surface of the torque-sensor housing, wherein the sensor case defines a bore;
installing an output shaft through a hole defined in the torque-sensor housing and into the cavity through the bore so that the sensor case completely encircles the output shaft; and
installing a torque-sensor connector of the torque sensor in a hole defined in the torque-sensor housing, wherein the connector is electrically connected to the torque sensor by wiring.

15. The method of claim 14 further comprising installing a bearing in the hole such that an outer race of the bearing is disposed against a perimeter of the hole and an inner race of the bearing is disposed against the output shaft.

16. The method of claim 14 further comprising installing the output shaft through a hole defined in the main housing.

* * * * *